(12) United States Patent
Mochizuki et al.

(10) Patent No.: US 10,352,546 B2
(45) Date of Patent: Jul. 16, 2019

(54) VEHICULAR HEADLAMP (71) Applicant: FUJIKURA LTD., Tokyo (JP)

(72) Inventors: Masataka Mochizuki, Tokyo (JP); Yuichi Yokoyama, Tokyo (JP); Randeep Singh, Tokyo (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/542,303

(22) PCT Filed: Jan. 28, 2016

(86) PCT No.: PCT/JP2016/052477
§ 371 (c)(1),
(2) Date: Jul. 7, 2017

(87) PCT Pub. No.: WO2016/129396
PCT Pub. Date: Aug. 18, 2016

(65) Prior Publication Data
US 2018/0266669 A1    Sep. 20, 2018

(30) Foreign Application Priority Data

Feb. 13, 2015    (JP) ................ 2015-025940

(51) Int. Cl.
F21S 45/47    (2018.01)
F21V 29/51    (2015.01)
(Continued)

(52) U.S. Cl.
CPC ........... *F21V 29/503* (2015.01); *F21S 41/00* (2018.01); *F21S 41/657* (2018.01); *F21S 43/00* (2018.01);
(Continued)

(58) Field of Classification Search
CPC .......... F21S 45/40–49; F21V 29/71–73; F21V 29/56–59; F21V 29/51–52
See application file for complete search history.

(56) References Cited

U.S. PATENT DOCUMENTS

| | | | | |
|---|---|---|---|---|
| 8,419,250 B2* | 4/2013 | Ohsawa | ................ | F21V 29/51 |
| | | | | 362/547 |
| 2003/0214803 A1* | 11/2003 | Ono | ................ | F21V 3/00 |
| | | | | 362/1 |

(Continued)

FOREIGN PATENT DOCUMENTS

| CN | 101910715 A | 12/2010 |
|---|---|---|
| CN | 102095148 A | 6/2011 |

(Continued)

OTHER PUBLICATIONS

Notice of Allowance from Japanese application No. 2015-025940 dated Jun. 14, 2016 (3 pages).

(Continued)

*Primary Examiner* — Mariceli Santiago
(74) *Attorney, Agent, or Firm* — Osha Liang LLP (57) ABSTRACT A vehicular headlamp includes a light source on which a light emitting diode is mounted on a substrate, a heat spreading plate attached to the substrate so as to be capable of transferring heat, a holding member integrated with the heat spreading plate, a heat pipe comprising a first end portion and a second end portion, each of which having a circular cross-section, the first end portion being rotatably engaged with the holding member, and a heat sink connected to the second end portion.

6 Claims, 8 Drawing Sheets (51) Int. Cl.

| | | |
|---|---|---|
| *F21V 29/77* | (2015.01) | |
| *F21S 41/143* | (2018.01) | |
| *F21S 41/657* | (2018.01) | |
| *F21V 29/503* | (2015.01) | |
| *F21Y 115/10* | (2016.01) | |
| *F21S 41/00* | (2018.01) | |
| *F21S 43/00* | (2018.01) | |
| *F21V 14/02* | (2006.01) | |
| *B60Q 1/076* | (2006.01) | |

(52) U.S. Cl.
CPC .............. *F21S 45/47* (2018.01); *F21V 14/02* (2013.01); *F21V 29/51* (2015.01); *F21V 29/77* (2015.01); *B60Q 1/076* (2013.01); *F21S 41/143* (2018.01); *F21Y 2115/10* (2016.08)

(56) References Cited

U.S. PATENT DOCUMENTS

| | | | |
|---|---|---|---|
| 2004/0202007 A1* | 10/2004 | Yagi | F21S 41/147 362/545 |
| 2007/0025105 A1* | 2/2007 | Inoue | B60Q 1/0683 362/249.07 |
| 2008/0225546 A1 | 9/2008 | Lin et al. | |
| 2008/0247177 A1* | 10/2008 | Tanaka | F21S 8/026 362/373 |
| 2010/0321950 A1* | 12/2010 | Wong | F21V 29/30 362/547 |
| 2011/0051448 A1* | 3/2011 | Owada | B60Q 1/0683 362/520 |
| 2012/0086321 A1* | 4/2012 | Lan | F21V 29/70 313/45 |

FOREIGN PATENT DOCUMENTS

| | | | |
|---|---|---|---|
| DE | 102010060642 A1 | 5/2012 | |
| JP | 2006-164967 A | 6/2006 | |
| JP | 2006164967 A * | 6/2006 | ............ F21V 29/004 |
| JP | 2008-130232 A | 6/2008 | |
| JP | 2009-087733 A | 4/2009 | |
| JP | 2011-249057 A | 12/2011 | |
| JP | 2013-073692 A | 4/2013 | |
| TW | 200837307 A | 9/2008 | |

OTHER PUBLICATIONS

Extended European Search Report issued in corresponding European Application No. 16749040.8 dated Aug. 23, 2018 (8 pages).
Office Action issued in corresponding Chinese Patent Application No. 201680005410.2 dated Jan. 11, 2019, with translation (12 pages).

* cited by examiner

VEHICULAR HEADLAMP

TECHNICAL FIELD

One or more embodiments of the present invention relate to a vehicular headlamp, and more particularly to a head lamp capable of changing light distribution.

CROSS-REFERENCE TO RELATED APPLICATIONS

Priority is claimed on Japanese Patent Application No. 2015-025940 filed Feb. 13, 2015, the content of which is incorporated herein by reference.

BACKGROUND

A control method automatically changing the light distribution of the headlamp according to the running environment of the vehicle is known as Adaptive Front-Lighting System (AFS). In this kind of control method, by detecting the running environment with a sensor, the headlamp is configured to rotate left and right around the vertical axis (i.e., swivel). Also, depending on the balance of the loads in the front and rear of the vehicle and the portion where the inclination of the road changes, the front portion of the vehicle body may be lifted or sunk down, and the vehicle body may be inclined slightly in the vertical direction relative to the road surface. A head lamp configured to change the irradiation angle (i.e., leveling) in the vertical direction of the headlamp by detecting such inclination with a sensor is conventionally known.

An apparatus configured to swivel a head lamp and to change the leveling is described in Patent Document 1. In the device described in Patent Document 1, the lamp unit is configured to be rotated in the lateral direction and the vertical direction of the vehicle by a swivel actuator and a leveling actuator.

PRIOR ART DOCUMENTS

Patent Documents

[Patent Document 1] Japanese Unexamined Patent Application, First Publication No. 2013-73692

Recently, light emitting diodes (LEDs) are used as a light source for head lamps for vehicles. Compared to halogen lamps and metal halide lamps conventionally used as light sources, LEDs are more susceptible to heat, and performance and durability are deteriorated at higher temperatures. Therefore, it is desired to limit the temperature of the LED in the head lamp using the LED as the light source. However, there is room for developing a new technology in order to satisfy both the sufficient heat radiation from the LED and the swivel function or the leveling function.

SUMMARY

One or more embodiments of the present invention provide a vehicular headlamp which is excellent in heat dissipation from a LED and in the swivel function or the leveling function.

A vehicular headlamp according to one or more embodiments of the present invention includes a light source on which a light emitting diode is mounted on a substrate, a heat spreading plate attached to the substrate so as to be capable of transferring heat, a holding member integrated with the heat spreading plate, a heat pipe including a first end portion and a second end portion, each of which having a circular cross-section, the first end portion being rotatably engaged with the holding member, and a heat sink connected to the second end portion.

The first end portion may be arranged so as to face a vertical direction or a width direction of the vehicle, and the light emitting diode and the substrate may be configured to rotate around the first end portion.

One of the first end portion and the second end portion may be arranged so as to face a vertical direction of the vehicle and other one of the first end portion and the second end portion may be arranged so as to face a width direction of the vehicle, and the second end portion may be rotatably engaged with the heat sink.

The holding member may include a cylindrical portion which is a cylindrical-shape member in which a hollow portion, into which the first end portion is inserted, and a slit communicating with an outer peripheral surface of the cylindrical portion from the hollow portion are formed, and a cut-out cylindrical body which is provided so as to cover a portion of an outer periphery of the cylindrical portion and which tightens the cylindrical portion from the outer periphery so that an opening width of the slit becomes narrower. A lubricant groove communicating with the slit may be formed in an inner peripheral surface of the cut-out cylindrical body.

A groove along an axial direction may be formed in an inner peripheral surface of the cylindrical portion.

The cut-out cylindrical body may include crimp end portions opposed to each other in a circumferential direction of the cut-out cylindrical body, and on an inner peripheral surface of each of the crimp end portions, an easily-deformable portion which facilitates deformation toward a radially-inward side of the cut-out cylindrical body may be provided.

According to the above-described aspects of one or more embodiments of the present invention, the light emitting diode serving as the light source can rotate together with the substrate around the first end of the heat pipe. Therefore, if the first end portion is arranged in the vertical direction of the vehicle, the light emitting diodes can swivel and the light distribution can be changed.

Alternatively, if the first end portion of the heat pipe is arranged in the width direction (lateral direction) of the vehicle, the installation angle of the light emitting diodes changes in the vertical direction of the vehicle. That is, the leveling changes. The heat pipe which is the center axis of such swivel or leveling is a heat conducting element which carries heat by the working fluid enclosed therein. Therefore, in addition to be the swivel axis or the leveling axis of the light source, the heat pipe transfers the heat generated by the light emitting diode to the heat sink to promote heat radiation from the light emitting diode and the substrate, and can limit a temperature increase.

DETAILED DESCRIPTION

Figure 1:
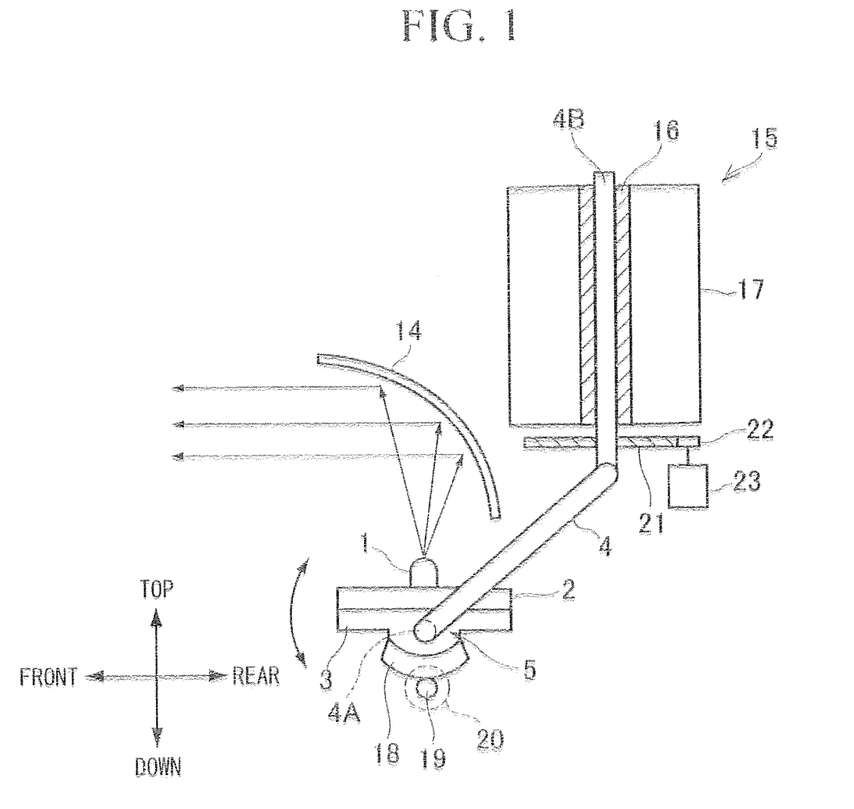
FIG. 1 is a side view schematically showing an example of a vehicular headlamp according to one or more embodiments of the present invention.
Figure 2:
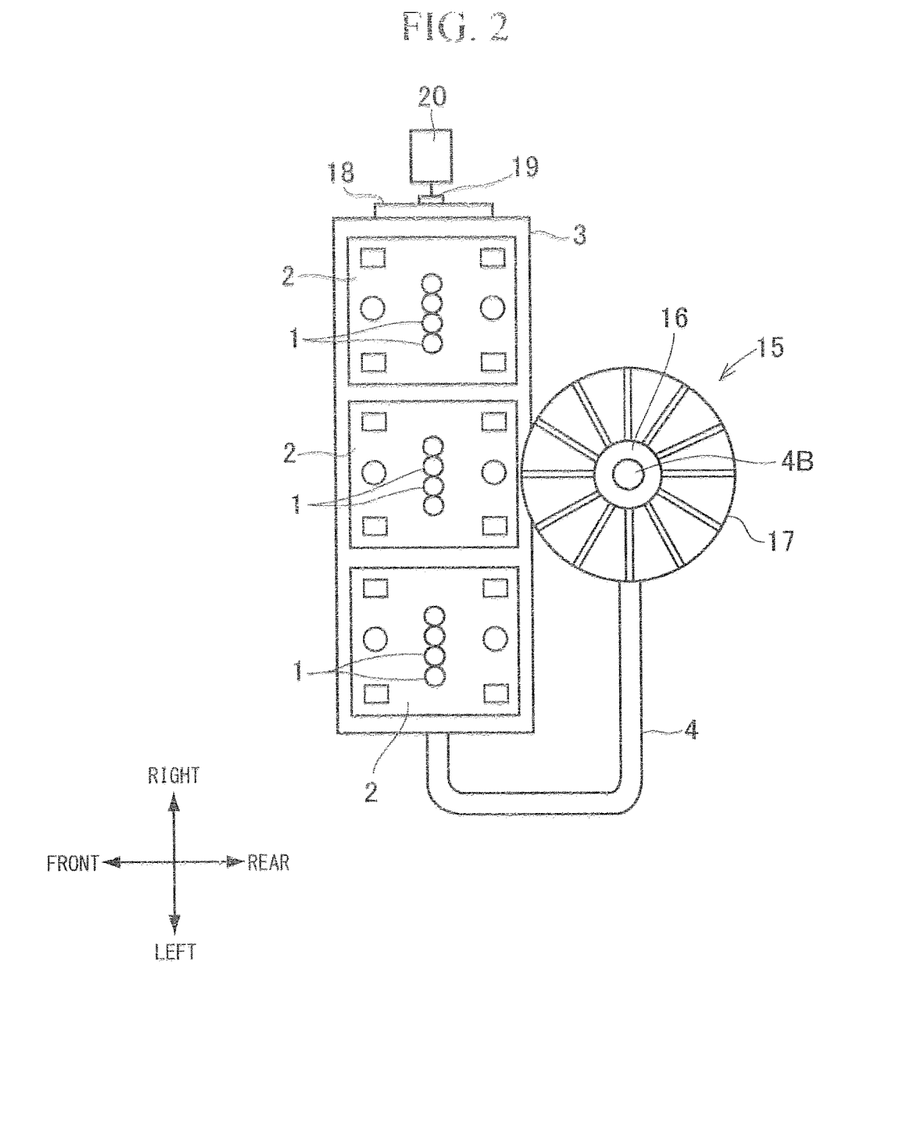
FIG. 2 is a plane view schematically showing an example of a vehicular headlamp according to one or more embodiments of the present invention.

FIGS. 1 and 2 schematically show an example of a vehicular headlamp according to one or more embodiments of the present invention. FIG. 1 is a side view when a vehicular headlamp is viewed from the left side of the vehicle, and FIG. 2 is a plane view when the vehicular headlamp is viewed from the top of the vehicle. In FIG. 2, a reflector 14 is omitted.

A light emitting diode (hereinafter, referred to as LED) 1 is provided as a light source. In the example shown here, three LEDs 1 are provided, and each LED 1 is mounted on a substrate 2 on which an electric circuit is formed. Each substrate 2 is mounted in close contact with an upper surface of a heat spreading plate 3 so that heat can be transferred. The heat spreading plate 3 diffuses heat generated by the LED 1 to a portion having a large area. For example, the heat spreading plate 3 is a plate-shape member made of aluminum or an aluminum alloy. The heat spreading plate 3 is rotatably connected to a one-end portion (first end portion) 4A of a heat pipe 4 that is arranged in the width direction (left and right direction) of a vehicle (not shown).

Therefore, the LED 1 is configured so as to be able to rotate in the vertical direction of the vehicle around the so-called horizontal axis (left and right axis) together with the substrate 2.

The heat pipe 4 is similar to the one conventionally known, and is a heat transfer element in which condensable fluid such as water is sealed as a working fluid in a pipe as a container in a state where a noncondensable gas such as air is degassed.

The one-end portion 4A of the heat pipe 4 is configured so that the cross-sectional shape thereof is circular. The one-end portion 4A having a circular cross-section is inserted into the holding member 5 so as to be rotatable and capable of transferring heat.

The holding member 5 is a member constituting a hinge together with the heat pipe 4. The holding member 5 is provided integrally with the heat spreading plate 3 at the center portion in the width direction on a surface of the heat spreading plate 3 opposite to a surface to which the substrate 2 is attached. The holding member 5 not only mediates heat conduction to the heat pipe 4, but also elasticity, strength, abrasion resistance, and the like are required as a part of the hinge. Therefore, it is formed of a material different from the heat spreading plate 3, and is formed of, for example, copper or a copper alloy.

A reflector 14 is arranged above the LED 1. The reflector 14 reflects the light emitted by the LED 1 toward the front of the vehicle, and is configured as a concave mirror.

As shown in FIG. 1, the one-end portion 4A of the heat pipe 4 is a rotation center axis for rotating the LED 1 together with the substrate 2. From the one-end portion 4A of the heat pipe 4 to an other-end portion (second end portion) 4B, as shown in FIG. 1, the heat pipe 4 is extended from the one-end portion 4A toward a rear surface of the reflector 14 and, as shown in FIG. 2, is bent with a substantially right angle (rear direction and right direction) so as to be divided into two portions. Furthermore, as shown in FIG. 1, the heat pipe 4 is bent upward at the rear side of the reflector 14 to reach the other-end portion 4B.

Therefore, while the one-end portion 4A is substantially horizontal, the other-end portion 4B is substantially vertical. That is, the end portions 4A and 4B have a twist position relationship which is substantially perpendicular to each other. A heat sink 15 is connected to the other-end portion 4B which is substantially perpendicular to the one-end portion 4A of the heat pipe 4.

Therefore, the heat sink 15 is arranged at a higher position (upper side) than the LED 1. The position of the other-end portion 4B in the longitudinal direction (lateral direction) of the substrate 2 is located substantially at the center portion of the substrate 2 (a center portion between the left-end portion of the left-end substrate 2 in the left and right direction and the right-end portion of the right-end substrate 2). This is because that the three LEDs 1 arranged at substantially the center portion of each substrate 2 are rotated around substantially the center portion in the arrangement direction.

The heat sink 15 having an appropriate configuration can be adopted as necessary. The heat sink 15 shown in FIGS. 1 and 2 has a configuration in which a plurality of radiating fins 17 are integrally and radially provided on the outer periphery of a boss portion 16. The heat sink 15 is constituted by extrusion molding or assembly of plates and fins. The other-end portion 4B of the heat pipe 4 is fitted to the boss portion 16 so as to be relatively rotatable. That is, the connecting portion between the other-end portion 4B of the heat pipe 4 and the heat sink 15 has a hinge structure.

Therefore, by fixing the heat sink 15, the LED 1 is configured to be rotatable in the width direction (lateral direction) of the vehicle together with the heat pipe 4 around the center axis of the heat sink 15.

In this case, the substrate 2 and the reflector 14 may be connected with a stay (not shown) reinforcing appropriate strength. By configuring so that the LED 1 can rotate in the width direction (lateral direction) of the vehicle, it is possible to change the optical axis of the light irradiated via the reflector 14 in the width direction (lateral direction) of the vehicle. That is, the optical axis of light can be swiveled.

A driving mechanism for leveling which changes the optical axis in the vertical direction of the vehicle and a driving mechanism for swivel which changes the optical axis in the width direction (lateral direction) of the vehicle will be described. The leveling is an operation in which the LED 1 rotates together with the substrate 2 around the one-end portion 4A of the heat pipe 4.

Therefore, for example, the fan-shaped gear 18 around the one-end portion 4A of the heat pipe 4 is attached to the substrate 2 or the heat spreading plate 3. A pinion gear 19 engaged with the fan-shaped gear 18 is rotated by a leveling motor 20. Accordingly, the LED 1 can be rotated together with the substrate 2 around the one-end portion 4A of the heat pipe 4.

In addition, in order to swivel the optical axis, a gear 21 is attached to a portion coaxial with the other-end portion 4B of the heat pipe 4 fitted to the heat sink 15. Then, a pinion gear 22 engaged with the gear 21 may be configured to be rotated by the swivel motor 23. Accordingly, the LED 1 can be rotated together with the substrate 2 around the other-end portion 4B of the heat pipe 4.

Although not specifically shown in the drawings, the heat sink 15 may be accommodated inside the outer cover accommodating the LED 1, the reflector 14, and the like, or may be arranged outside the outer cover.

Figure 3:
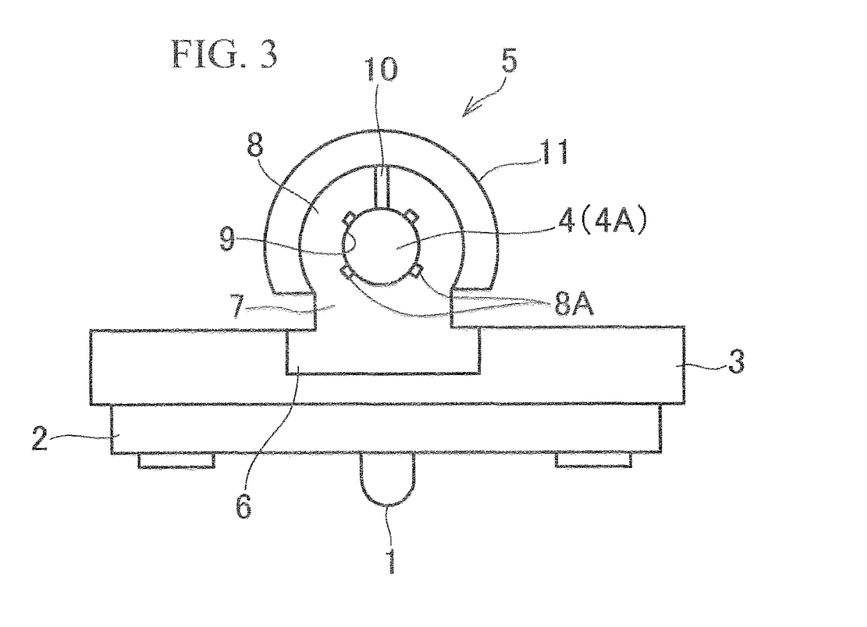
FIG. 3 is a side view showing an example of a holding member of the vehicular headlamp according to one or more embodiments of the present invention.
Figure 4:
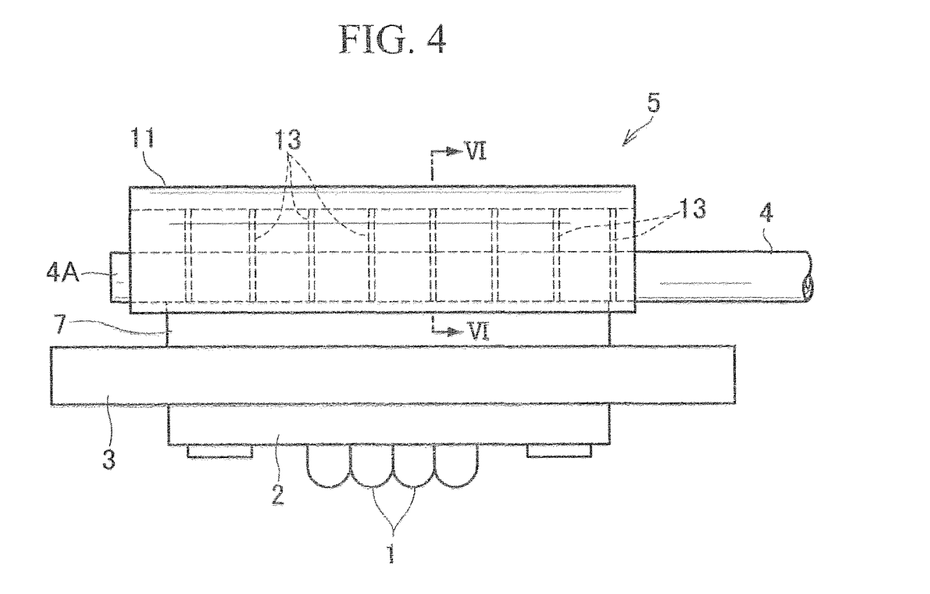
FIG. 4 is a rear view of an example of the holding member shown in FIG. 3.

FIGS. 3 and 4 show an example of the structure including the holding member 5 and connecting the heat spreading plate 3 and the heat pipe 4.

FIG. 3 is a side view of the connection structure described above as viewed from the right side of the vehicle, and FIG. 4 is a rear view of the connection structure described above as viewed from the rear side of the vehicle.

The holding member 5 includes a base portion 6. The base portion 6 has a rectangular plate shape and is fitted in the heat spreading plate 3 and integrated with the heat spreading plate 3.

In addition, the holding member 5 has a neck portion 7 provided in a state of rising from the base portion 6 (in a state of protruding downward from the base portion 6) and a cylindrical portion 8 which is a member having a cylindrical shape and is formed at a lower end portion of the neck portion 7. A hollow portion 9 into which the one-end portion 4A of the heat pipe 4 is inserted in a relatively rotatable manner is formed in the cylindrical portion 8.

In addition, in the cylindrical portion 8, a slit 10 is formed that communicates with the outer peripheral surface from the hollow portion 9 at a portion opposite to the neck portion 7 and is continuous in the front-rear direction (axial direction). The slit 10 is formed to push and open the cylindrical portion 8 to the left and right so as to enlarge the inner diameter of the hollow portion 9. Alternatively, the slit 10 is formed to reduce the inner diameter of the hollow portion 9 by bringing the left and right portions of the cylindrical portion 8 close to each other.

In order to easily cause elastic deformation of the cylindrical portion 8 and suppress variations of the deformation amount, it may be possible to form a plurality of grooves 8A oriented in the axial direction on the inner peripheral surface of the cylindrical portion 8.

Figure 5:
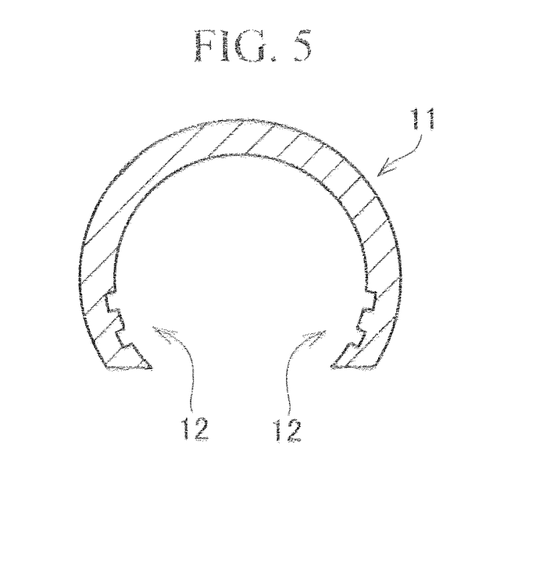
FIG. 5 is a cross-sectional view of a crimp ring of the vehicular headlamp according to one or more embodiments of the present invention.
Figure 6:
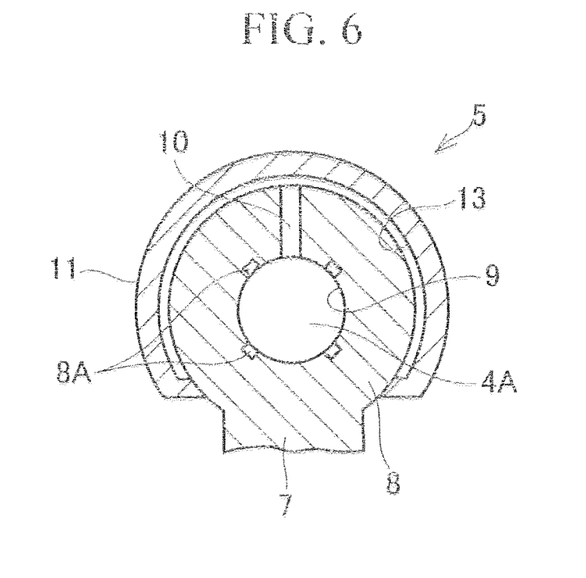
FIG. 6 is a cross-sectional view taken along the VI-VI line in FIG. 4.

Furthermore, the holding member 5 is provided so as to cover a portion of the outer periphery of the cylindrical portion 8, and includes a crimp ring (cut-out cylindrical body) 11 that tightens the cylindrical portion 8 from the outer peripheral side. FIG. 5 is a cross-sectional view of the crimp ring 11, and FIG. 6 is a cross-sectional view taken along the line VI-VI of FIG. 4.

The crimp ring 11 is configured such that a sectional shape has a C-shape by cutting out approximately a one-fourth to two-fifth portion of the cylindrical member in the circumferential direction. Then, the crimp ring 11 is mounted on the outer peripheral side of the cylindrical portion 8 in a state where the inner diameter is enlarged by pushing open a cut-out portion, and thereafter the crimp ring 11 is crimped by applying a deformation load in a direction to close the cut-out portion.

Thereby, the crimp ring 11 is configured to tighten the cylindrical portion 8 from the outer peripheral side. In other words, the opening width of the slit 10 of the cylindrical portion 8 is narrowed.

In addition, as shown in FIG. 5, at the end portions (crimp end portions) of the crimp ring 11 opposed to each other in the circumferential direction, an easily-deformable portion 12 is formed on the inner peripheral surface of the cylindrical body. The easily-deformable portion 12 is a portion which is easily deformed toward the inner circumferential side (radially-inward side) of the crimp ring 11 by a load tightening the cylindrical portion 8 to suppress looseness due to buckling. For example, the easily-deformable portion 12 is a portion which is partially thinned by forming a plurality of grooves in the axial direction on the inner peripheral surface of the end portion of the crimp ring 11.

As shown in FIGS. 4 and 6, a lubricant groove 13 is further formed on the inner peripheral surface of the crimp ring 11. The lubricant groove 13 is a groove foamed in the circumferential direction on the inner circumferential surface of the crimp ring 11, and a plurality of the lubricant grooves 13 are formed with a certain interval in the axial direction. The lubricant groove 13 is a groove which is opened toward the inner peripheral side of the crimp ring 11. In this case, as shown in FIG. 6, when the crimp ring 11 is mounted on the cylindrical portion 8, the lubricant groove 13 constitutes a space surrounded by the inner peripheral surface of the crimp ring 11 and the outer peripheral surface of the cylindrical portion 8.

The slit 10 formed in the cylindrical portion 8 with respect to the lubricant groove 13 is open to the outer peripheral surface of the cylindrical portion 8. Therefore, the lubricant groove 13 and the slit 10 communicate with each other.

Both end portions of the lubricant groove 13 may be opened at each end portion in the circumferential direction of the crimp ring 11. Both end portions of the lubricant groove 13 may slightly protrude radially inward from each end portion of the crimp ring 11 in the circumferential direction. That is, both end portions of the lubricant groove 13 are closed end portions. Both end portions of the lubricant groove 13 are used as closed end portions in order to prevent the lubricant held in the lubricant groove 13 from leaking to the outside.

Next, the operation of the headlamp according to one or more embodiments will be described. When the LED 1 is energized, the LED 1 emits light, and the light is emitted toward the front of the vehicle by the reflector 14. Heat generated by the light emission is transferred from the substrate 2 to the heat spreading plate 3.

In addition, the heat transferred to the heat spreading plate 3 is transferred to the heat sink 15 via the heat pipe 4, and is dissipated from the heat sink 15 to surrounding air. In the examples shown in FIGS. 1 and 2, since the heat sink 15 is arranged at a position higher than the LED 1 (upward direction), the heat pipe 4 operates in a so-called bottom heat mode. That is, the working fluid condensed by dissipating heat can be returned to the end portion 4A on the side of the LED 1 by gravity.

Therefore, dry out in which the working fluid in the liquid phase is insufficient at the end portion 4A to be the evaporating portion does not occur. That is, even when the heat generation amount of the LED 1 is large, heat can be sufficiently transported.

In this way, the heat of the LED 1 is deprived by the surrounding air. Therefore, an increase in the temperature of the LED 1 is reduced, and deterioration of the performance or durability of the LED 1 and the headlamp is prevented or suppressed.

Even when the heat sink 15 is arranged inside the outer cover, the heat of the LED 1 is dissipated to the air inside the outer cover. Then, an increase in temperature at a hot spot generated at the LED 1 and in the vicinity of the LED 1 is suppressed.

Therefore, as in the case where the heat sink 15 is arranged outside the outer cover, deterioration in performance or durability of the LED 1 and the headlamp can be prevented or suppressed.

On the other hand, when the swivel motor 23 as shown in FIG. 1 is driven, the gear 21 rotates via the pinion gear 22. Then, the heat pipe 4 integrated with the gear 21 rotates around the central axis of the heat sink 15. The LED 1 is attached to the heat pipe 4 together with the substrate 2 via the heat spreading plate 3.

Therefore, the LED 1 and the substrate 2 rotate in the width direction (left and right direction) of the vehicle around the center axis of the heat sink 15. Since the reflector 14 rotates together, the optical axis of the light emitted from the LED 1 moves in the width direction (lateral direction) of the vehicle. That is, the optical axis of the light swivels, and the light distribution of the headlamp changes.

When the leveling motor 20 as shown in FIG. 2 is driven, the fan-shaped gear 18 rotates via the pinion gear 19. Then, the heat spreading plate 3 integrated with the fan-shaped gear 18 rotates around the center axis of the one-end portion 4A of the heat pipe 4. Therefore, the LED 1 and the substrate 2 attached to the heat spreading plate 3 rotate in the vertical direction of the vehicle around the center axis of the one-end portion 4A of the heat pipe 4.

As described above, the lubricant groove 13 is formed in the inner peripheral surface of the crimp ring 11, and the lubricant is held in the lubricant groove 13. The lubricant is supplied to the hollow portion 9 via the slit 10 formed in the cylindrical portion 8. Therefore, the space between the one-end portion 4A of the heat pipe 4 and the inner peripheral surface of the cylindrical portion 8 is lubricated, so that the heat spreading plate 3 smoothly rotates together with the substrate 2 and the LED 1.

In such manner, the optical axis of the light emitted by the LED 1 changes in the vertical direction of the vehicle, and the leveling is performed.

In the headlamp according to the present embodiment, since the LED 1 mounted on the substrate 2 rotates around the center axis of each end 4A and 4B of the heat pipe 4, swivel and leveling can be performed.

In addition, the heat pipe 4 constituting the rotation center transfers the heat generated at the LED 1 to the heat sink 15 and dissipates into the surrounding air. Therefore, it is possible to suppress the increase of the temperature of the LED 1, and to prevent or suppress deterioration of the performance or durability of the LED 1 and the headlamp.

In the above-described example, it is configured such that both the swivel and the leveling are performed. However, in one or more embodiments of the present invention, the LED 1 may be configured so as to rotate together with the substrate 2 around the end portion of the heat pipe 4 and such that either one of the swivel and the leveling can be performed.

Figure 7:
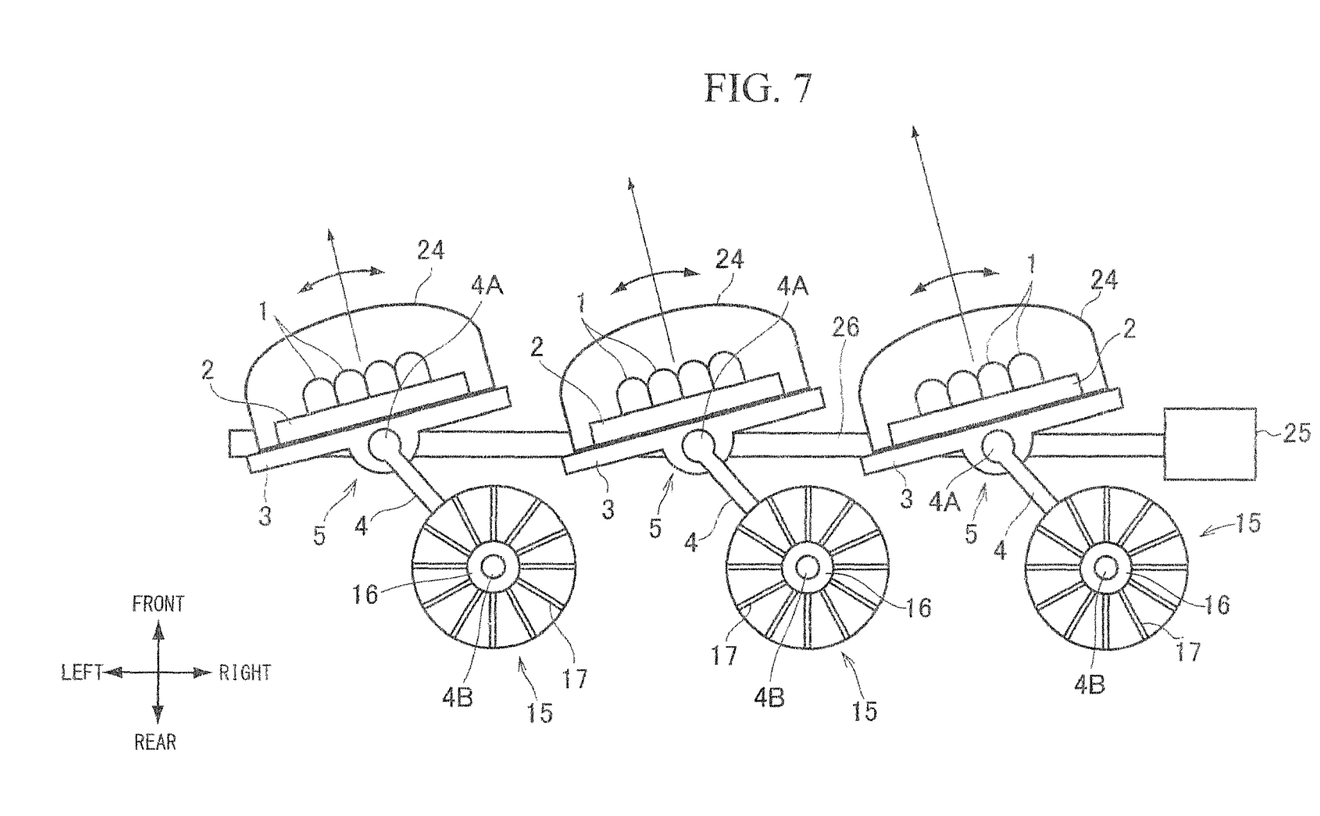
FIG. 7 is a plane view schematically showing another example of the vehicular headlamp according to one or more embodiments of the present invention.
Figure 8:
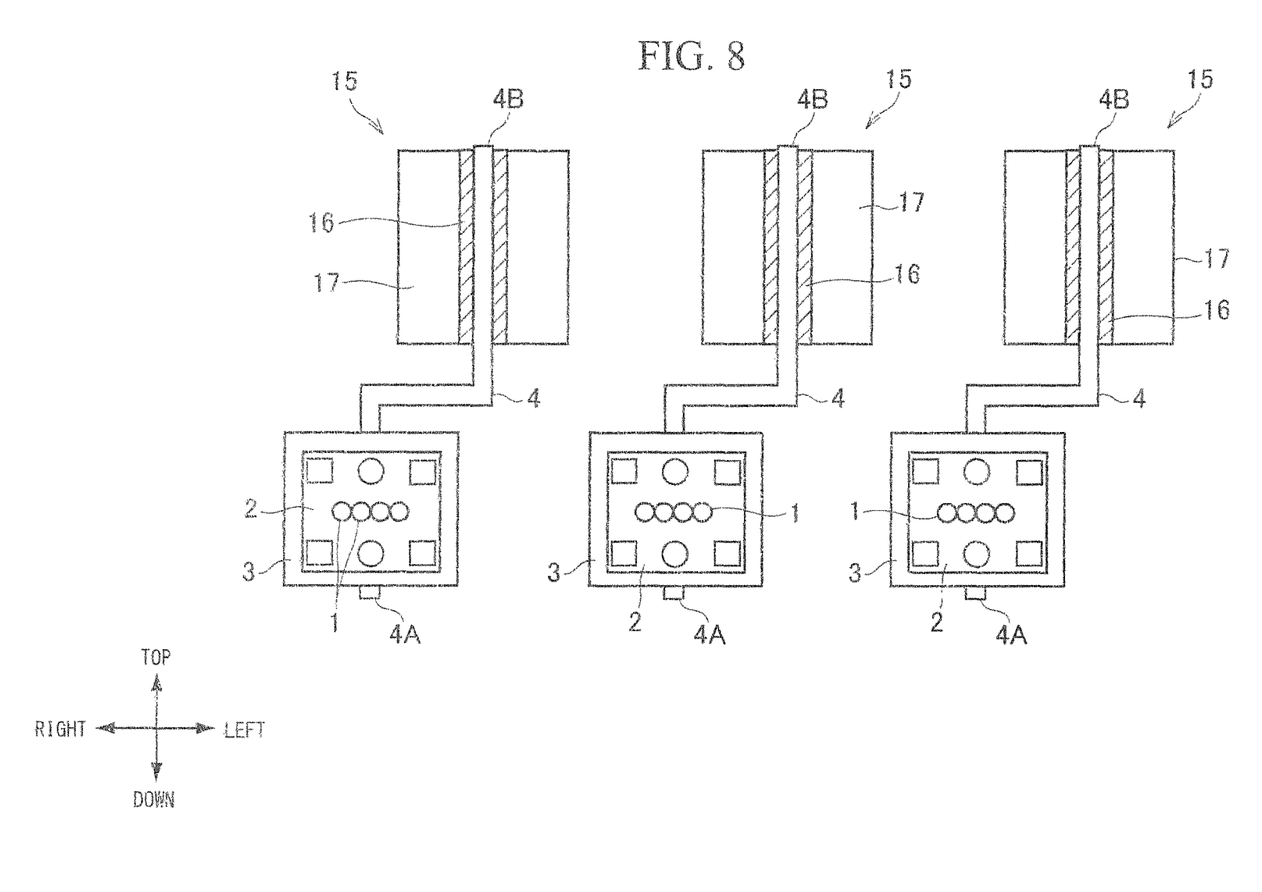
FIG. 8 is a front view schematically showing another example of the vehicular headlamp according to one or more embodiments of the present invention.

Next, embodiments according to the present invention will be described with reference to FIGS. 7 and 8. FIGS. 7 and 8 show an example in which a plurality of LEDs 1 (three in the example of the drawings) is mounted on the corresponding substrate 2. Each substrate 2 is attached to a corresponding one of the heat spreading plates 3. Each substrate 2 is arranged side by side in the width direction (lateral direction) of the vehicle.

In addition, the holding member 5 is attached to a surface of the heat spreading plate 3 opposite to the surface to which each substrate 2 is attached. The one-end portion 4A of the heat pipe 4 is inserted into the holding member 5 from the upper side so as to be capable of heat transfer. The configuration of the holding member 5 is the same as the configuration shown in FIGS. 3 and 4 described above.

Therefore, each substrate 2 can rotate around the central-axis line of the one-end portion 4A of the heat pipe 4. In other words, the LED 1 is configured to be able to change its direction in the width direction (lateral direction) of the vehicle. Each LED 1 may be covered with a transparent cover 24 together with the substrate 2.

As shown in FIG. 7, a swivel actuator 25 changing the direction of the LED 1 is provided. The swivel actuator 25 can be constituted by an actuator such as a solenoid linearly moving back and forth, a motor or the like. When using actuators linearly moving back and forth, a drive shaft 26 and the respective heat spreading plates 3 or the substrate 2 are connected by an appropriate link mechanism (not shown) such as a lever.

When a motor is used, for example, a worm (screw gear) is arranged on the same axis as the drive shaft 26 of the motor, and a gear (not shown) engaging with the worm is connected to each of the heat spreading plates 3 or the substrate 2.

The heat pipe 4 provided in each LED 1 is bent in a crank shape on a rear side of the heat spreading plate 3 and the other-end portion 4B extends upward and is connected to the heat sink 15 so as to be capable of transferring heat. In the configuration shown in FIGS. 7 and 8, the LED 1 can rotate around the one-end portion 4A of the heat pipe 4. The other-end portion 4B of the heat pipe 4 is connected to the heat sink 15 so as not to be rotatable with respect to the heat sink 15. In other words, the other-end portion 4B and the heat sink 15 may be connected so as to enable heat transfer.

The heat sink 15 may be arranged inside the outer cover (not shown), or may be provided outside the outer cover, similarly to the example shown in FIGS. 1 to 6 described above.

Figure 9:
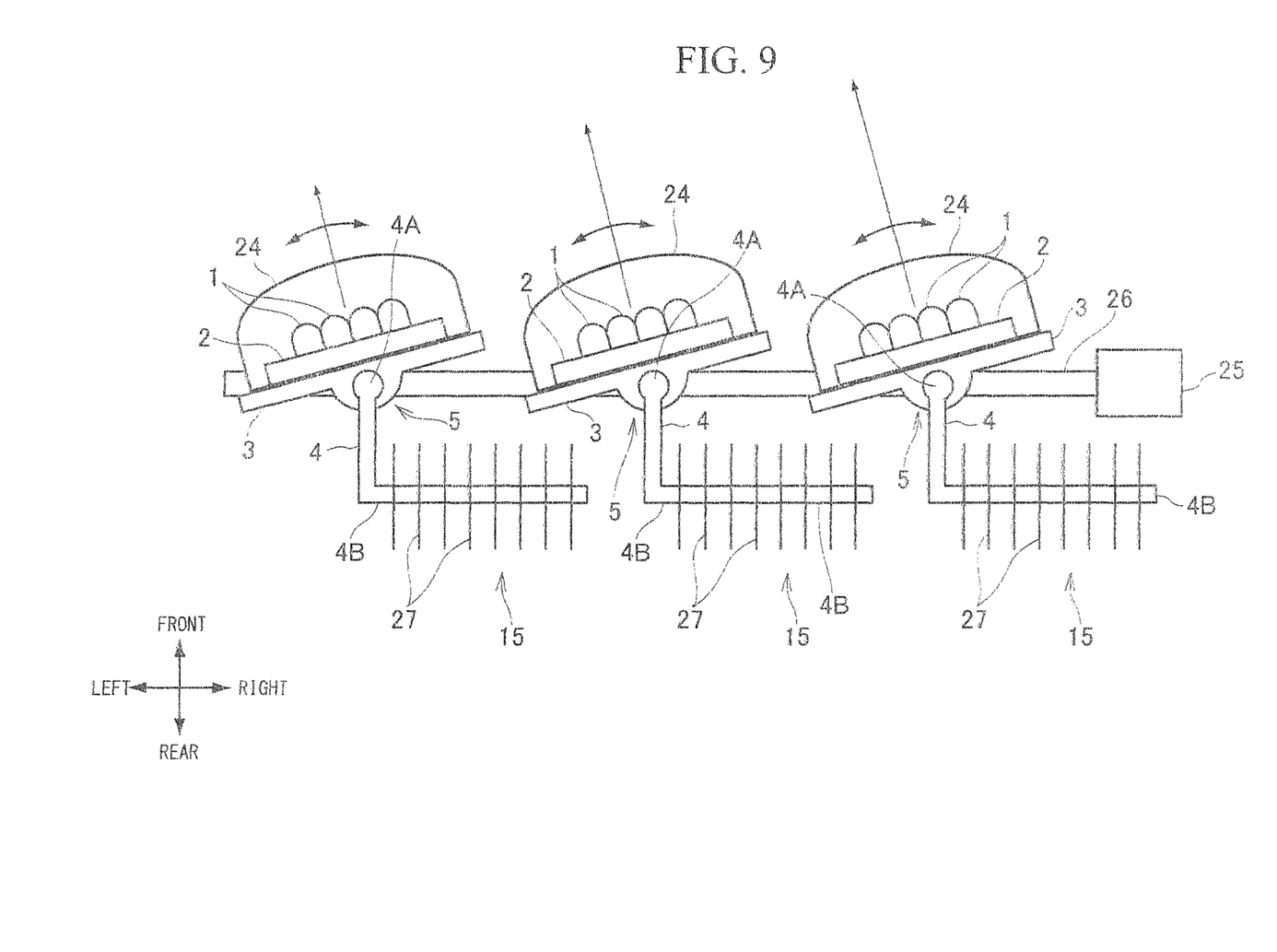
FIG. 9 is a plane view schematically showing further another example of the vehicular headlamp according to one or more embodiments of the present invention.
Figure 10:
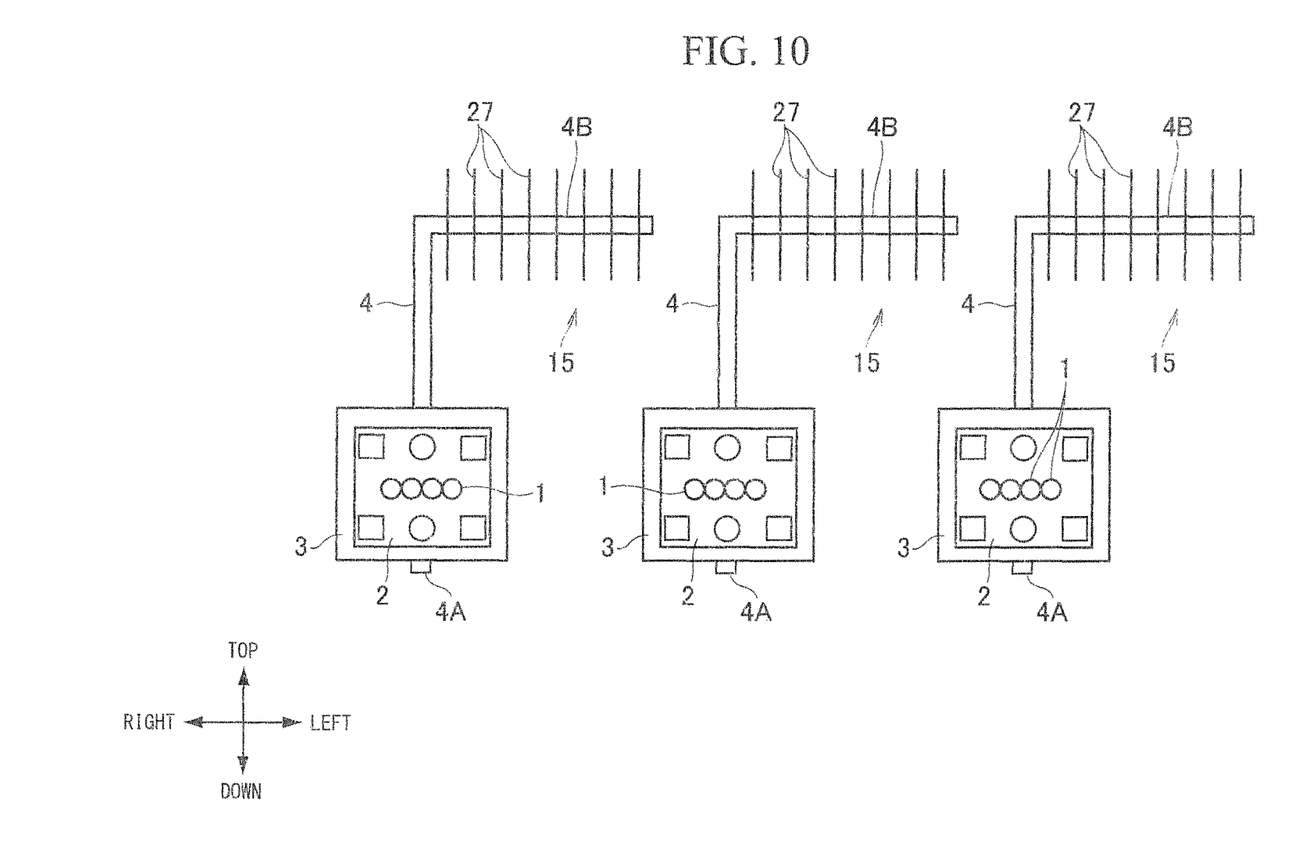
FIG. 10 is a front view schematically showing further another example of the vehicular headlamp according to one or more embodiments of the present invention.

In the one or more embodiments shown in FIGS. 9 and 10, the configuration of the heat sink 15 in the embodiments shown in FIGS. 7 and 8 is changed. That is, the other-end portion 4B of the heat pipe 4 extends in the width direction (lateral direction) of the vehicle at a position higher than the substrate 2 on a rear side of the substrate 2.

In addition, a number of radiating fins 27 are attached to the end portion 4B, and the heat sink 15 is formed. Other configurations are the same as those shown in FIGS. 7 and 8.

In both of the headlamp constituted as shown in FIGS. 7 and 8 and the headlamp constituted as shown in FIGS. 9 and 10, the one-end portion 4A of the heat pipe 4 is a rotation axis when swivel to change the light distribution is performed. In addition, the heat pipe 4 can convey the heat of the LED 1 to the heat sink 15 to cool the LED 1.

Therefore, according to the headlamp of the one or more embodiments described above, it is possible to sufficiently perform the function of swivel, and at the same time to suppress the temperature increase of the LED 1 to prevent or suppress deterioration in performance and durability.

It should be noted that the present invention is not limited to the above-described embodiments. In addition to the configuration in which all the LEDs are simultaneously rotated in the same direction, only one of the plurality of LEDs may be rotated, and the other LEDs may be fixed. For example, it may be configured so that only the LED for high beam can be leveled.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

DESCRIPTION OF THE REFERENCE SYMBOLS

1: light emitting diode (LED)
2: substrate
3: heat spreading plate
4: heat pipe
5: holding member
8: cylindrical portion
8a: groove
9: hollow portion
10: slit
11: crimp ring
12: easily-deformable portion
13: lubricant groove
4a: one-end portion (first end portion, of the heat pipe)
4b: other-end portion (second end portion, of the heat pipe)
15: heat sink
20: leveling motor
23: swivel motor
25: swivel actuator
27: radiating fin

The invention claimed is:

1. A vehicular headlamp comprising:
a light source on which a light emitting diode is mounted on a substrate;
a heat spreading plate attached to the substrate so as to be capable of transferring heat;
a holding member integrated with the heat spreading plate;
a heat pipe comprising a first end portion and a second end portion, wherein the first end portion and the second end portion each has a circular cross-section, and the first end portion is rotatably engaged with the holding member; and
a heat sink connected to the second end portion,
wherein the holding member comprises:
a cylindrical portion having a hollow portion, into which the first end portion is inserted, and a slit communicating with an outer peripheral surface of the cylindrical portion from the hollow portion; and
a cut-out cylindrical body that covers a portion of an outer periphery of the cylindrical portion and tightens the cylindrical portion from the outer periphery so that an opening width of the slit becomes narrower, and
wherein a lubricant groove communicating with the slit is formed in an inner peripheral surface of the cut-out cylindrical body.

2. The vehicular headlamp according to claim 1,
wherein the first end portion faces a vertical direction of the vehicle, and
wherein the light emitting diode and the substrate rotate around the first end portion.

3. The vehicular headlamp according to claim 1, wherein a groove along an axial direction is formed in an inner peripheral surface of the cylindrical portion.

4. The vehicular headlamp according to claim 1,
wherein the cut-out cylindrical body comprises crimp end portions opposed to each other in a circumferential direction of the cut-out cylindrical body, and
wherein on an inner peripheral surface of each of the crimp end portions, a deformable portion that deforms toward a radially-inward side of the cut-out cylindrical body is provided.

5. The vehicular headlamp according to claim 1,
wherein the first end portion faces a width direction of the vehicle, and
wherein the light emitting diode and the substrate rotate around the first end portion.

6. The vehicular headlamp according to claim 1,
wherein one of the first end portion and the second end portion faces a vertical direction of the vehicle and the other one of the first end portion and the second end portion faces a width direction of the vehicle, and
wherein the second end portion is rotatably engaged with the heat sink.

* * * * *